Figures 1, 2:
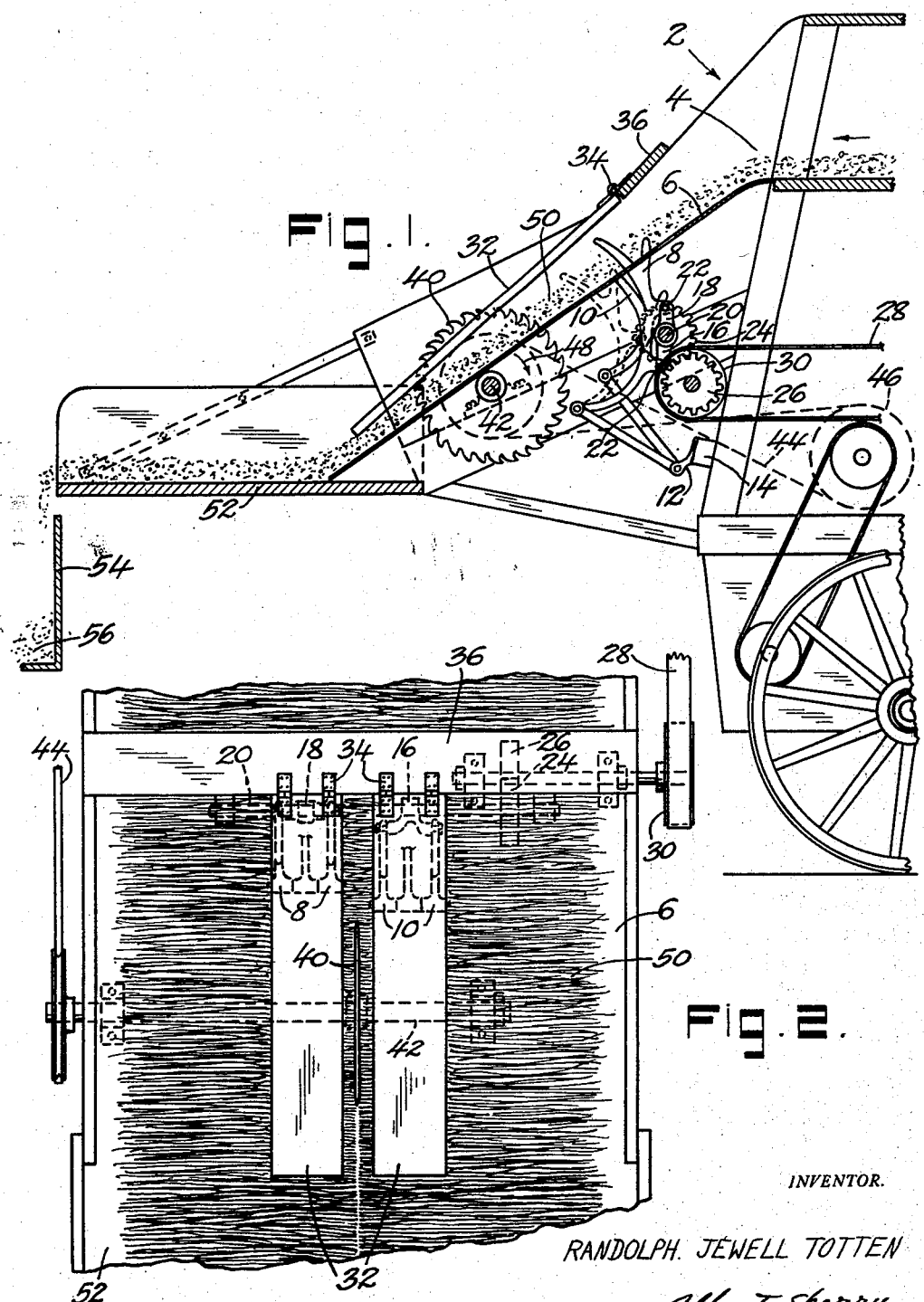

INVENTOR.
RANDOLPH JEWELL TOTTEN
BY Albert Sperry
ATTORNEY

UNITED STATES PATENT OFFICE 2,522,320

STRAW CUTTER

Randolph Jewell Totten, Yardville, N. J.

Application July 13, 1948, Serial No. 38,497

2 Claims. (Cl. 146—73)

My invention relates to mechanism for cutting straw into suitable lengths for use as bedding for horses, cattle, or other animals. My invention is directed particularly to constructions adapted to be used in combination with a thresher whereby the straw may be cut and prepared for baling directly after it is threshed.

The best straw for use as bedding for animals is rye straw since such straw is more flexible and tougher than the straw from wheat, oats, and other grain. This is a factor of considerable importance in bedding race horses which are provided with relatively sharp shoes. Such horses are high strung and restless and stamp their feet much more than ordinary work horses. Therefore more brittle straw is broken and chopped into dust very quickly so that it becomes useless as bedding. On the other hand, rye straw is generally three to four feet or more in length whereas the best length for straw to be used as bedding is about 18 to 24 inches.

In order to provide rye straw for bedding heretofore it has been usual to bale the straw while of full length. The resulting bales are large, heavy, and difficult to handle and when the straw is to be used, the bale first has to be cut in half to produce the desired length of straw. The operation of baling and handling full length rye straw requires the use of an expensive and heavy type of baler and equipment whereas the operation of cutting the finished bale in half is troublesome and expensive.

In accordance with my invention, means are provided for cutting straw into length suitable for use for bedding before it is baled and directly as it leaves the thresher. The straw thus prepared may be baled by means of a conventional hay baler and the operation of cutting the bales to provide the desired length of straw may be eliminated altogether. In the preferred form of my invention shown in the drawing and hereafter described, the cutting mechanism is applied directly to a thresher so that the straw is cut immediately upon discharge from the thresher and is then transferred to the hopper of a baler.

One of the objects of my invention is to provide a novel type of mechanism for cutting straw into suitable lengths for use as bedding.

Another object of my invention is to produce precut rye straw suitable for baling by means of a conventional hay baler.

A further object of my invention is to reduce the cost and labor required to produce rye straw for bedding.

Another object of my invention is to produce rye straw bales in which the straw is of suitable length for bedding purposes.

These and other objects and features of the present invention will appear from the following description thereof in which reference is made to the figures of the accompanying drawing.

In the drawing:

Fig. 1 is a side elevation of a portion of a thresher having a typical form of straw cutter embodying my invention applied thereto, parts being shown in section, and Fig. 2 is a top plan view of the construction shown in Fig. 1.

In that form of my invention chosen for purposes of illustration in the drawing, the cutter is used in combination with a thresher indicated generally at 2 and having a discharge mouth 4 through which the threshed straw is delivered. Any suitable form of thresher may be used but in the construction shown, the invention is applied to a Butterworth threshing machine and utilizes the conventional driving means employed for actuating the various elements of the thresher in the normal operation thereof.

In the thresher illustrated, the threshed straw is discharged from the machine through the discharge mouth 4 onto the delivery table or chute 6. The straw is positioned so that it lays crosswise of the table in position to be engaged and positively advanced by means of the fingers 8 and 10. These fingers are pivotally connected at their lower ends to bracket 12 mounted on the body 14 of the thresher. The upper free ends of the fingers are alternately raised and advanced and then retracted by means of the oppositely disposed cranks 16 and 18 carried by shaft 20 and connected to the fingers at 22 near the midpoint thereof. Shaft 20 is rotated by gears 24 and 26 driven by belt 28 from the power operated pulley 30 on the thresher.

The elements of the construction described above are common to many types of threshing machines now on the market and are ordinarily used to cause the straw to be advanced along the delivery table 6 to a bundling or tying mechanism which gathers the straw into a sheaf and ties it together. In accordance with the present invention such bundling and tying means are removed or omitted from the thresher and the fingers 8 and 10 serve to feed the straw to the cutting mechanism.

The fingers 8 and 10 are spaced apart and in order to cut the straw as it is discharged from the thresher, holding members 32 are located over the fingers 8 and 10 in position to retain the straw advanced by the fingers in contact with the upper surface of the table 6. The holding members shown are hingedly connected at 34 to the hood 36 of the discharge opening of the thresher whereas the lower ends of the members 32 are directly in contact with the straw advancing along the table 6 under the action of the fingers 8 and 10.

A cutter 40 is located between the holding members 32 and is mounted on a shaft 42 which extends transversely of the mechanism below the delivery table. The shaft 42 is driven by belt 44 from the pulley 46 attached to one of the shafts of the thresher which is driven at a suitable speed during the operation of the thresher. The blade of the cutter 40 projects upward through a slot in the delivery table 6 and between the holding members 32. The blade of the cutter 40 preferably is provided with teeth similar to those of a saw, although the teeth preferably are not "set" laterally but instead are positioned in alignment throughout the circumference of the cutter. The cutter rotates in the direction indicated by the arrow 48 so as to engage the straw 50 as it advances along the table 6. In practice the cutter generally rotates at a speed of from 1000 to 2000 R. P. M. and has a diameter of approximately 18 inches. The linear speed of the cutting edge is therefore approximately 3000 to 6000 feet per minute.

The straw advancing toward the cutter 40 is thus severed by a downward stroke from the cutting teeth or blade while being positively advanced by fingers 8 and 10 and held in place on the table 6 by the holding members 32. The newly threshed straw is thereby severed substantially midway of its length or at any other desired point so that the resulting cut straw is of suitable length for bedding and approximately 18 to 24 inches long. The cut straw passing the cutter is pushed on past the lower ends of the holding members by the fingers 8 and 10 and is discharged onto the lower table 52 from which it may be loaded directly into the hopper 54 of a baler indicated generally at 56.

In normal practice an operator stands on the lower table 52 and controls the feed of straw into the hopper of the baler although the straw may be discharged directly into the hopper of the baler in some instances. However, most hay balers have a reciprocating plunger which moves within the hopper and therefore an operator can direct and feed the straw to the baler more easily and satisfactorily than ordinary conveying means.

The resulting baled straw consists of lengths of straw suitable for use directly in bedding animals. The cut and baled straw is very easy to handle and may be used just as it is received by breaking open the bale and without any further cutting of the straw by the user.

While a typical and preferred form of straw cutter embodying my invention has been shown in the drawing and herein described, it will be apparent that numerous changes and modifications may be made in the form construction and arrangement of the elements employed. Thus the type of cutter used and the manner in which it is driven may obviously be varied and the mechanism may be applied to any type of thresher whether the straw advancing fingers are provided or other discharge means are employed. In view thereof it should be understood that the form of my invention particularly disclosed herein is intended to be illustrative only and is not intended to limit the scope of my invention.

I claim:

1. In combination with a thresher having a downwardly sloping discharge table over which threshed straw is passed, means for positively moving straw longitudinally of said table and down said slope while arranged so that the straw extends transversely of the table, a rotary cutting blade located near the lower end of said table and lying in a plane extending longitudinally of said table in position to sever the straw substantially midway in the length thereof, said cutting blade being mounted on a shaft extending transversely of the table below the same and presenting a cutting edge projecting through a slot in the table and above the surface of the table over which the straw is moved, means for rotating the leading edge of said cutting blade downward toward said table so as to sever the straw by a downward stroke, and means pivotally connected to the thresher and yieldably movable toward the table for urging the straw being cut toward the surface of said table and to prevent substantial bending of the straw during the cutting operation.

2. In combination with a thresher having a downwardly sloping discharge table over which threshed straw is passed, means for positively moving straw longitudinally of said table and down said slope while arranged so that the straw extends transversely of the table, a toothed rotary cutting blade located near the lower end of said table and lying in a plane extending longitudinally of said table in position to sever the straw substantially midway in the length thereof, said cutting blade being mounted on a shaft extending transversely of the table below the same and presenting a cutting edge projecting through a slot in the table and above the surface of the table over which the straw is moved, means connected to an element of the thresher which is driven in the normal operation thereof for rotating said cutting blade at a linear speed of at least 3000 feet per minute, and gravity actuated straw holding members located above said table and on opposite sides of said cutter in position to hold the straw in place on the table during the cutting thereof.

RANDOLPH JEWELL TOTTEN.

REFERENCES CITED

The following references are of record in the file of this patent:

UNITED STATES PATENTS

| Number | Name | Date |
|---|---|---|
| 90,605 | Sumner | May 25, 1869 |
| 280,457 | Doherty et al | July 3, 1883 |
| 939,981 | Coburn | Nov. 16, 1909 |
| 1,516,507 | Seng | Nov. 25, 1924 |
| 1,690,508 | Stokes | Nov. 6, 1928 |
| 1,918,830 | Bem | July 18, 1933 |
| 2,281,846 | Klein | May 5, 1942 |

FOREIGN PATENTS

| Number | Country | Date |
|---|---|---|
| 591,020 | Germany | Jan. 15, 1934 |
| 54,528 | Netherlands | Apr. 16, 1943 |